June 28, 1938. L. J. KEARNEY 2,122,007
MOUNTING FOR HINGES OR THE LIKE
Filed Nov. 23, 1936
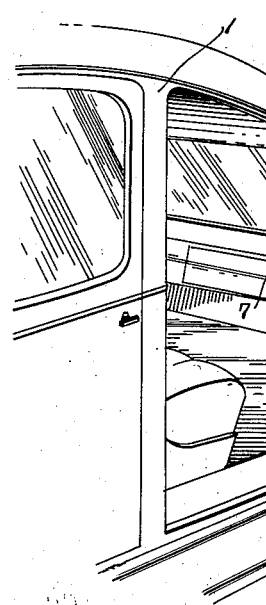
Fig.1.
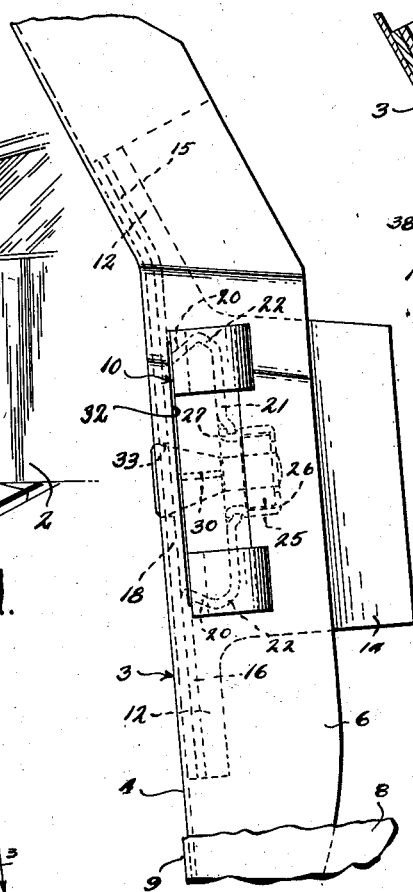
Fig.4.
Fig.5.
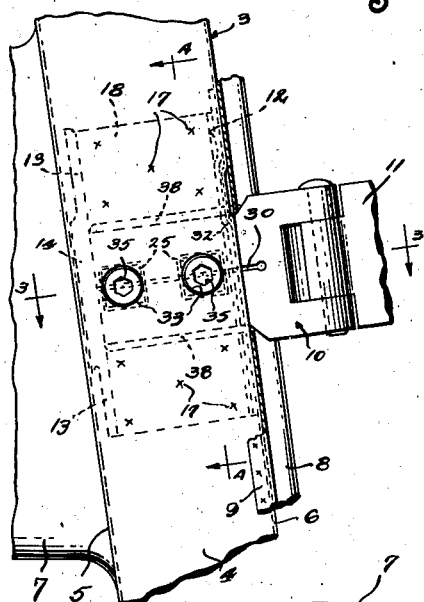
Fig.2.
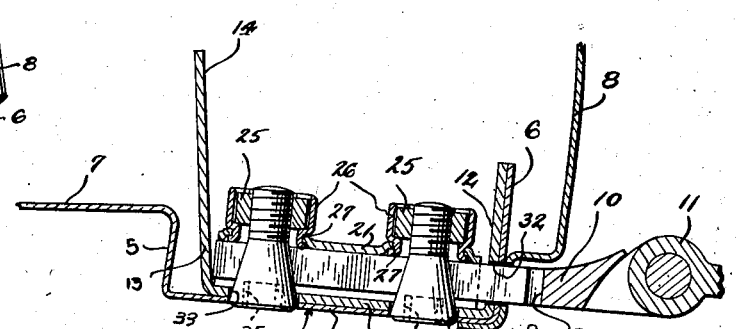
Fig.3.
INVENTOR.
Lawrence J. Kearney
BY Barnes, Kisselle, Laughlin & Raisch
ATTORNEYS Patented June 28, 1938

2,122,007

UNITED STATES PATENT OFFICE 2,122,007

MOUNTING FOR HINGES OR THE LIKE

Lawrence J. Kearney, Detroit, Mich., assignor to General Motors Corporation, Detroit, Mich., a corporation of Delaware Application November 23, 1936, Serial No. 112,311

17 Claims. (Cl. 16—149)

This invention relates to a mounting structure for an element such as a hinge, and to a hinge butt structure, or the structure of other brackets, supports or the like, all with particular reference to bodies of steel construction for automotive vehicles.

The invention perhaps finds its greatest use in hinge mounting, and the present disclosure, both as to description and drawing, illustrate the invention embodied in the mounting of a hinge butt plate in the steel work of the body of an automobile. Among the objects of the invention is the provision of a strong mounting structure for securely mounting the hinge butt to a post construction of a body, and which mounting furnishes support and reenforcement for such post structure. Considerable load is sometimes required of the hinges of the doors of automobiles, and the structure distributes this load to the body structure. The post structure of the body to which the door is hinged may be somewhat of a channel formation, which channel formation may be of relatively light stock, that is stock of relatively small gauge, and, as distinguished from concentrating the load on this relatively light structure immediately at the point of hinge mounting, the load is distributed over some considerable area. Also, among the objects of the invention is the provision of a structure by means of which a hinge butt may be easily and accurately located and mounted and which, if necessary, may be removed and reinstalled in the event it is necessary to make repairs or entirely replace the hinge or hinge butt. A still further object of the invention is to provide a simple rugged structure whereby the hinge butt is effectively clamped or wedged into position and securely held in such position. Other objects of the invention will appear as the detailed description progresses, which may be considered in connection with the accompanying drawing wherein:

Fig. 1 is a perspective view of a portion of an automobile body with a door in open position illustrating the hinge mounting for the door.

Fig. 2 is a side elevational view of a portion of the post structure of the body to which the hinge butt is secured.

Fig. 3 is an enlarged cross sectional view taken on line 3—3 of Fig. 2.

Fig. 4 is a similarly enlarged cross sectional view taken substantially on line 4—4 of Fig. 2.

Fig. 5 is a similarly enlarged view looking at the structure shown in Fig. 2, viewing the same from the right-hand side thereof.

The view in Fig. 1 shows principally the environment of the invention, the body of an automobile being illustrated generally at 1, a door at 2 hinged to what may be termed a post structure generally indicated at 3.

This post structure may be formed along the lines illustrated in Figs. 3 and 5, the same being of channel form having a back 4, which is visible when the door is open, and side portions 5 and 6. The channel structure may be integral with a piece 7 which may extend across the car transversely and which may constitute the base support for an instrument panel. Where the windshield is inclined the post structure may be formed to provide such incline as illustrated in Fig. 5.

Extending forwardly of the post 3 may be a panel 8 which may be termed the cowl panel, or that portion of the vehicle providing a housing at the forward end for the engine, or for other purposes, and this cowl panel may be associated with the post structure 3 in any suitable manner as for example by having a portion fashioned partially around the same as illustrated at 9 and welded or otherwise secured thereto.

A hinge member which may be termed a hinge butt is shown at 10, which is to be secured to the body, and another hinge member 11 is to be secured to the door. A reenforcing member of sheet metal structure, but which advantageously may be of heavier gauge, is placed within the channel of the post, the same having a back wall 18 which may rest flush against the back 4 of the post. This reenforcement member is preferably of channel formation with side walls 12 and 13 with one wall, such as the wall 12, positioned substantially flush against the wall 6 of the post. One or both side walls may be formed with increased height for further reenforcement, this increased height forming a sort of a wing 14.

Placed over this reenforcement member is a hinged butt holding plate. It has an end portion 15 which may lie flush against a portion of the reenforcement plate and an opposite end portion 16 also arranged to lie against the reenforcement plate. These three superposed layers may all be securely united by spot welding, which spots are indicated for example as at 17 in Fig. 2, the weld connections being taken through portions 15 and 16 of the holding plate and through the reenforcement member and wall 4 of the post structure.

The intermediate portion of the holding plate is fashioned to provide a concavity for the reception of the hinge butt. The shape of this concavity is perhaps best shown in Fig. 4, and it comprises opposite wall portions 20 which preferably diverge outwardly, and a central bridging portion 21 connected to the diverging walls by angular parts 22. The angular parts 22 avoid the necessity of a sharp angle in the metal between the diverging walls 20 and the bridging part 21.

The bridging part 21 preferably carries one or more nuts, depending upon the number of screws or bolts to be used in holding the hinged butt in place, there being two shown in the present instance. Each nut is illustrated at 25 non-rotatably held assembled to the bridging piece 21 by nut retainers 26. Each nut retainer has a portion 27 which extends through an aperture in the bridging part 21 with the metal turned over to maintain the assembly as illustrated.

The hinge butt is split or slotted as at 30 and is provided with tapered apertures, the center line of which is preferably located in line with the slot 30. The hinge butt may be located by passing the same endwise through aligned apertures 32 in the post, the reenforcing member and the cowl panel 8. Screws or bolts may then be passed through aligned apertures 33 in the back portion 4 of the post structure and in the reenforcement member. These screws have tapered heads advantageously of the same angularity as the apertures in the hinge butt. These screws may be of the so-called Allen type, in that they are recessed as at 35 for the reception of a tool for turning the same. Thus the heads of the Allen screws may, in final assembly, be brought substantially flush with the outer face of the post. The heads of these Allen screws are the only thing visible in final assembly when the door is open.

The hinge butt is shaped in cross section so as to conform with the shape of the recess in the holding member, thus having inclined portions 38 for cooperating with the portions 20 and inclined portions 39 corresponding to the portions 22.

In making an assembly it will be understood, of course, that the reenforcing plate and holding plate are joined to the channel of the body structure. The hinge butt may be passed through the aligned apertures 32, and then the tapered screws inserted and the threads caught with the threads of the nuts. As the screws are tightened the hinge butt is drawn tightly against the bridging piece 21. The tapered screws tend to expand the hinge butt or rather spread the two parts on the opposite side of the slot 30 into engagement with the opposite walls of the cavity in the holding plate. Thus the hinge butt is held tightly clamped or wedged on all four sides, as it is in effect clamped between the heads of the screws and the bridging piece 21, and between the opposite walls of the cavity. Moreover, a dovetail action is obtained in that as the hinge butt is expanded the inclined parts 38 contact with the portions 20, wedge fashion, and there is a component force tending to urge the hinge butt against the bridging piece 21 and the more or less rounded corners 22. Accordingly, it will be noted that the hinge butt is effectively held in place against shifting vertically or laterally. The installation is quickly and easily made and the hinge butt may be easily removed for repair, replacement or any other purpose.

The load carried by the hinge is distributed over a substantial area to the post 3, as distinguished from being concentrated at the bolts or screws for holding the hinge butt in place. The load is communicated to the post at relatively widely spaced points on opposite sides of the hinge butt, namely, at the weldings 17. As shown herein the channel 3 is of relatively light gauge stock and with such a structure the use of the reenforcing plate is preferred. However, in assemblies where the channel or post structure is of adequate strength or made of sufficiently heavy stock for the purpose, the reenforcing plate may be dispensed with, in which case the holding plate is secured directly to the post.

The hinge butt is in effect a sort of a bracket and the invention, of course, is applicable to a mounting for any sort of bracket or support. In some of the claims appended hereto language is used which in effect terms the hinge element a hinge butt or the like; this is to be construed to cover any other bracket or support member.

I claim:

1. In a structure for mounting a hinge butt or the like to a sheet metal supporting member, the combination of a holding plate secured at its opposite ends to the supporting member, said holding plate having an intermediate depressed portion providing a cavity, an expansible hinge butt in the cavity, and means passing through the hinge butt for expanding the same for securing the same to the holding plate.

2. In a structure for mounting a hinge butt or the like to a sheet metal supporting member, the combination of a holding plate secured at its opposite ends to the supporting member, said holding plate having an intermediate depressed portion providing a cavity, an expansible hinge butt in the cavity, and screws passing through apertures in the support and through the hinge butt for expanding the hinge butt and for securing the hinge butt against that portion of the holding plate which constitutes the bottom of the cavity.

3. In a structure for mounting a hinge butt or the like to a sheet metal supporting member, the combination of a holding plate, said holding plate having an intermediate depressed portion providing a cavity with opposite walls of the cavity rising from the body of the plate and with a bottom portion connecting said walls, said holding plate being secured to the support on opposite sides of said intermediate portion, a hinge butt disposed in the cavity, said hinge butt having bolt apertures extending therethrough, said hinge butt comprising two portions separated by a slot extending through the hinge butt and intersecting the bolt apertures, and bolt means for bolting the hinge butt to the bottom portion of the cavity, said bolt means having tapered portions lying in the apertures in the hinge butt adapted to expand the same upon tightening whereby the two parts of the hinge butt are forced against the said opposite walls of the cavity.

4. In a structure for mounting a hinge butt or the like to a sheet metal supporting member, the combination of a holding plate secured adjacent opposite ends of the supporting member, said holding plate having an intermediate depressed portion providing a cavity defined by walls rising from the body of the holding plate in diverging manner and a bottom portion connecting said walls, a hinge butt having a cross sectional shape substantially matching that of the cavity and disposed into two parts separated by a slot, said hinge butt having bolt apertures therethrough with which the slot intersects, and bolt means having tapered portions disposed in the apertures of the hinge butt for bolting the hinge butt to the bottom of the cavity, said inclined portions arranged to spread the hinge butt to force the opposite edges thereof into contact with the said inclined walls.

5. In a structure for mounting a hinge butt or the like to a sheet metal supporting member, the combination of a holding plate having an intermediate depressed portion providing a cavity which is defined by opposite walls rising from the holding plate and a bottom portion connecting said opposite walls, said holding plate being secured to the supporting member on opposite sides of its depressed portion, means associated with the said bottom of the cavity for supporting nuts, a hinge butt located in the cavity and provided with tapered apertures therethrough, said hinge butt having two parts divided by a slot and which slot intersects the apertures, and screw members with tapered heads passing through the apertures in the hinge butt and screw threaded into the nuts with the tapered heads lying in the tapered apertures and adapted upon tightening to bolt the hinge butt to the bottom of the cavity and to spread the hinge parts into engagement with the said opposite walls of the cavity.

6. In a structure for mounting a hinge butt or the like to a sheet metal supporting member of relatively light gauge, the combination of a holding plate having an intermediate depressed portion which provides a cavity, a reenforcing plate lying against the support, said holding plate being disposed against the reenforcing plate, the holding plate, reenforcing plate and supporting member being secured together on opposite sides of the intermediate depressed portion of the holding plate, a split hinge butt located in the cavity, and bolt means passing through the hinge butt for expanding the same into contact with the sides of the cavity and bolting the same to the bottom of the cavity in the holding plate.

7. In a structure for mounting a hinge butt or the like to a sheet metal supporting member of relatively light gauge, the combination of a holding plate having an intermediate depressed portion which provides a cavity, a reenforcing plate lying against the support, said holding plate disposed against the reenforcing plate, the holding plate, reenforcing plate and supporting member being secured together on opposite sides of the intermediate depressed portion of the holding plate, a hinge butt located in the cavity, and bolt means passing through the hinge butt and bolting the same to the bottom of the cavity of the holding plate, said hinge butt having two parts divided by a slot intersecting the bolt apertures therein and said bolt having tapered portions adapted, upon tightening of the bolts, to expand the hinge butt parts into engagement with opposite walls of the cavity.

8. In a structure for mounting a hinge butt or the like to a sheet metal supporting member of relatively light gauge, the combination of a holding plate having an intermediate depressed portion which provides a cavity, a reenforcing plate of channel structure lying against the support, said holding plate being disposed within the channel of the reenforcing plate and lying against the same, the holding plate, reenforcing plate and supporting member being secured together on opposite sides of the intermediate depressed portion of the holding plate, an expansible hinge butt located in the cavity, and bolt means passing through the hinge butt for expanding the hinge butt and bolting the same to the bottom of the cavity in the holding plate.

9. In a structure for mounting a hinge butt or the like to a channel form sheet metal supporting member of an automobile body, the combination of a holding plate having an intermediate depressed portion forming a cavity defined by opposite walls, and a bottom portion connecting the opposite walls and having end portions disposed substantially against the supporting member and welded thereto, said supporting member having an aperture in one side of its channel form, a hinge butt extending through the aperture and lying in the said cavity, said hinge butt having tapered bolt apertures therethrough, said hinge butt being split in a direction transversely of the supporting member with the split intersecting the bolt apertures, said supporting member having apertures through which bolts are adapted to pass, and bolt means for bolting the hinge butt to the bottom portion of the cavity, said bolt means having tapered portions lying in the tapered bolt apertures in the hinge butt and adapted upon being tightened to spread the hinge butt into engagement with said opposite walls of the cavity.

10. In a structure for mounting a hinge butt or the like to a sheet metal supporting member of an automobile body of relatively light gauge and of channel form, a reenforcing plate of channel form disposed within the channel form of the supporting member and lying thereagainst, a holding plate over the reenforcing plate and having an intermediate depressed portion providing a cavity defined by side walls and a bottom, said supporting member, reenforcing plate and holding plate being weld united on opposite sides of said cavity, one side of the channel form of the supporting member and reenforcing plate having aligned apertures, a hinge butt passing through the apertures and lying in the cavity, said hinge butt having tapered bolt apertures extending therethrough and said hinge butt being split to provide two hinge butt parts, with the split intersecting the bolt apertures, nuts carried by the portion of the holding plate constituting the bottom of the cavity, the back of the channel form of the supporting member and reenforcing plate having aligned apertures for the passage of bolt means therethrough, bolt means having tapered portions lying in the bolt apertures in the hinge butt and adapted upon being tightened, to bolt the hinge butt to and against the bottom of the cavity and to expand the hinge butt parts into engagement with opposite side walls of the cavity.

11. In a structure for mounting a hinge butt or the like to a sheet metal supporting member of an automobile body of relatively light gauge and of channel form, a reenforcing plate of channel form disposed within the channel form of the supporting member and lying thereagainst, a holding plate over the reenforcing plate and having an intermediate depressed portion providing a cavity defined by side walls and a bottom, said supporting member, reenforcing plate and holding plate being weld united on opposite sides of said cavity, one side of the channel form of the supporting member and reenforcing plate having aligned apertures, a hinge butt passing through the apertures and lying in the cavity, said hinge butt having tapered bolt apertures extending therethrough and said hinge butt being split to provide two hinge butt parts, with the split intersecting the bolt apertures, nuts carried by the portion of the holding plate constituting the bottom of the cavity, the back of the channel form of the supporting member and reenforcing plate having aligned bolt passage apertures, bolt means having tapered portions lying in the bolt apertures in the hinge butt and adapted upon being tightened, to bolt the hinge butt to and against the bottom of the cavity and to expand the hinge butt parts into engagement with opposite side walls of the cavity, said side walls of the cavity diverging outwardly from the body of the holding plate, and said hinge butt having inclined edge portions corresponding to the diverging angle of the side walls, whereby upon expansion of the hinge butt component forces serve to urge the hinge butt toward the bottom of said cavity.

12. In a mounting for a hinge butt or the like, a sheet metal support having a socket, an expansible hinge butt disposed in the socket, said socket and hinge butt having a similar dovetail shape when looking in a direction substantially normal to the direction of the extent of the support, and means for securing the hinge butt in the socket and for expanding it against the dovetail walls of the socket.

13. In a mounting for a hinge butt or the like, a sheet metal support having a transversely extending socket opening at one end and of dovetail formation, a split hinge butt having a similar dovetail formation in cross section disposed in the socket and projecting out through the opening, and means for securing the hinge butt in the socket and for spreading the same into contact with opposite inclined walls of the dovetail formation of the socket.

14. In a mounting for a hinge butt or the like, a sheet metal support structure extending generally in an up and down direction and having a socket formed of fashioned sheet metal and extending transversely of the support and which is open at one end, a split hinge butt in the socket projecting out through the opening, said socket and hinge butt being of similar dovetail formation when viewed in up and down cross section, and bolt means for securing the hinge butt in the socket and arranged to expand the split hinge butt into contact with the dovetail socket walls.

15. In a mounting for a hinge butt or the like in an automotive vehicle body of metal construction, a sheet metal post member having a socket formed by fashioned sheet metal, said socket being open at one end, a hinge butt in the socket and projecting out through the opening, said socket and hinge butt disposed transversely of the post and being of similar dovetail form when viewed in cross section in the direction of the extent of the post, said hinge butt being split longitudinally, and bolt means with tapered parts for bolting the hinge butt into the socket and for expanding the split hinge butt against the dovetail walls of the socket.

16. In a mounting for a hinge butt or the like, a sheet metal support having a socket, an expansible hinge butt disposed in the socket, said socket having a bottom wall and side walls arranged for contact with side and edge faces of the hinge butt, and means for securing the hinge butt in the socket against the bottom wall thereof and for expanding the hinge butt against the side walls of the socket.

17. In a mounting for a hinge butt or the like, a metal support having a socket with side walls, an expansible hinge butt disposed in the socket, and means for securing the hinge butt in the socket including means for expanding the hinge butt so that opposite edges thereof are forced into tight engagement with the side walls of the socket.

LAWRENCE J. KEARNEY.